United States Patent
Wabeke et al.

(10) Patent No.: US 12,497,062 B2
(45) Date of Patent: Dec. 16, 2025

(54) METHOD, APPARATUS, AND COMPUTER PROGRAM FOR CONTROLLING OUTPUT OF INFORMATION

(71) Applicants: TomTom International B.V., Amsterdam (NL); TomTom Navigation B.V., Amsterdam (NL)

(72) Inventors: Elise Wabeke, Rotterdam (NL); Kees Wesselius, Wormer (NL)

(73) Assignees: TomTom International, Amsterdam (NL); TomTom Navigation B.V., Amsterdam (NL)

( * ) Notice: Subject to any disclaimer, the term of this patent is extended or adjusted under 35 U.S.C. 154(b) by 158 days.

(21) Appl. No.: 18/518,856

(22) Filed: Nov. 24, 2023

(65) Prior Publication Data
US 2024/0182061 A1    Jun. 6, 2024

(30) Foreign Application Priority Data
Dec. 5, 2022 (EP) .................................... 22211394

(51) Int. Cl.
*B60W 50/14* (2020.01)
(52) U.S. Cl.
CPC ......... *B60W 50/14* (2013.01); *B60W 2540/22* (2013.01)
(58) Field of Classification Search
CPC .... B60W 50/14; B60W 2540/22; G08G 1/00; A61B 5/165; A61B 5/18
USPC ......................................................... 701/36
See application file for complete search history.

(56) References Cited

U.S. PATENT DOCUMENTS

| | | | |
|---|---|---|---|
| 7,428,449 B2 * | 9/2008 | Fehr ...................... | B60W 40/08 |
| | | | 701/1 |
| 9,751,534 B2 * | 9/2017 | Fung .................... | G06V 10/764 |
| 10,915,175 B2 * | 2/2021 | Marti ..................... | B60K 35/10 |
| 2007/0182529 A1 | 8/2007 | Dobler et al. | |
| 2013/0049943 A1 | 2/2013 | Wendt et al. | |
| 2021/0287697 A1 * | 9/2021 | Marti ..................... | G10L 25/63 |

FOREIGN PATENT DOCUMENTS

| | | | | |
|---|---|---|---|---|
| EP | 1914106 A2 | 4/2008 | | |
| EP | 2138988 A1 * | 12/2009 | ............ | B60W 40/09 |
| EP | 2828135 A1 | 1/2015 | | |
| EP | 3245093 B1 * | 9/2021 | ............. | B60K 28/02 |

OTHER PUBLICATIONS

European Search Report; Application No. 22211394.6; Completed: Feb. 25, 2025; 6 Pages.
Extended European Search Report for application 22211394.6 dated Jun. 1, 2023.

* cited by examiner

*Primary Examiner* — Tuan C To
(74) *Attorney, Agent, or Firm* — Whitmyer IP Group LLC

(57) ABSTRACT

Certain examples of the present disclosure relate to a computer implemented method (100) for controlling an output of information to a driver of a vehicle, the method comprising: determining (101) workload data (204) indicative of a workload of the driver, and generating (102) control data (205) for controlling the output of information (206, 207) to the driver based at least in part on the workload data.

20 Claims, 4 Drawing Sheets

METHOD, APPARATUS, AND COMPUTER PROGRAM FOR CONTROLLING OUTPUT OF INFORMATION

TECHNOLOGICAL FIELD

Examples of the present disclosure relate to a computer implemented method, an apparatus and a computer program for controlling the output of information. Some examples, though without prejudice to the foregoing, relate to controlling the output of information to a driver of a vehicle so as to avoid overloading the driver thereby improving driver safety.

BACKGROUND

Digital in-car systems like Advanced Driver Assistance Systems (ADAS) or In Vehicle Infotainment Systems (IVIS) aim to assist a driver. However, the output of their signals and information to the driver can distract the driver from the driver's primary task of driving the vehicle. This can lead to an increased risk of accidents. Both the driver's task of driving as well as the driver's task of receiving and perceiving information output from various in-car systems demand attention from the driver. If the overall demands on driver's attention, i.e. the driver's workload, due to the tasks exceeds the driver's capacity to perform such tasks, this can overload the driver. This can lead to degradation of driver's performance of tasks (including the driver's primary task of driving) and hence can give rise to an increased risk of accidents.

Conventional methods and systems for outputting information to a driver are not always optimal.

In some circumstances, it can be desirable to improve the control of the output of information to a driver of a vehicle. In some circumstances it can be desirable to improve driver safety by enhanced control of the output of information to a driver of a vehicle. In some circumstances, it can be desirable to control the output of information to a driver of a vehicle so as to avoiding/reduce the risk of overloading the driver.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any examples and features described in this specification that do not fall under the scope of the independent claims are to be interpreted as examples useful for understanding various embodiments of the invention.

According to various, but not necessarily all, examples of the disclosure there is provided a computer implemented method for controlling an output of information to a driver of a vehicle, the method comprising:
  determining workload data indicative of a workload of the driver, and
  generating control data for controlling the output of information to the driver based at least in part on the workload data.

According to at least some examples of the disclosure there is provided an apparatus for controlling an output of information to a driver of a vehicle, the apparatus comprising:
  means for determining workload data indicative of a workload of the driver, and
  means for generating control data for controlling the output of information to the driver based at least in part on the workload data.

According to various, but not necessarily all, examples of the disclosure there is provided a module, chipset, circuitry, device and/or system comprising means for performing the above-mentioned method.

According to various, but not necessarily all, examples of the disclosure there is provided a computer program comprising instructions which, when executed by a computing device, cause the computing device to:
  determine workload data indicative of a workload of the driver, and
  generate control data for controlling the output of information to the driver based at least in part on the workload data.

According to various, but not necessarily all, examples of the disclosure there is provided an apparatus comprising:
  at least one processor; and
  at least one memory including computer program code;
  the at least one memory storing instructions that, when executed by the at least one processor, cause the apparatus at least to:
    determine workload data indicative of a workload of the driver, and
    generate control data for controlling the output of information to the driver based at least in part on the workload data.

According to various, but not necessarily all, examples of the disclosure there is provided a non-transitory computer readable medium encoded with instructions that, when performed by at least one processor, causes at least the following to be perform:
  determining workload data indicative of a workload of the driver, and
  generating control data for controlling the output of information to the driver based at least in part on the workload data.

According to various, but not necessarily all, examples of the disclosure there is provided a computer implemented method comprising:
  controlling an output, to a driver from a mobile communications device, of a notification of a received message or of an active communication based at least in part on one or more of:
    map data;
    traffic data;
    navigation data;
    location data;
    sensor data from one or more vehicle sensors; and
    data indicative of a media output status of a media output device.

According to various, but not necessarily all, examples of the disclosure there is provided a computer implemented method comprising:
  controlling an output, to a driver from a media output device, of media based at least in part on one or more of:

map data;
traffic data;
navigation data;
location data;
sensor data from one or more vehicle sensors; and
data indicative of a communication status of a mobile communications device.

According to various, but not necessarily all, examples of the disclosure there is provided a computer implemented method comprising:
controlling an output, to a driver from a navigation device, of navigation information based at least in part on one or more of:
sensor data from one or more vehicle sensors;
data indicative of a communication status of a mobile communications device; and
data indicative of a media output status of a media output device.

According to various, but not necessarily all, examples of the disclosure there is provided a computer implemented method comprising:
controlling an output, to a driver from at least one of:
a mobile communication device, and
a media output device; and
wherein said controlling is based at least in part on data from at least one of:
a navigation system,
a vehicle sensor system, and
an Advanced Driver Assistance System.

The following portion of this 'Brief Summary' section describes various features that can be features of any of the examples described in the foregoing portion of the 'Brief Summary' section. The description of a function should additionally be considered also to disclose any means suitable for performing that function, as well as computer program instructions which, when executed by a computing device, cause the computing device to carry out that function.

According to various, but not necessarily all, examples of the disclosure, determining the workload data is based, at least in part, on context data, and wherein the context data is based on one or more of:
map data;
traffic data;
navigation data;
location data;
sensor data from one or more vehicle sensors;
data indicative of a communication status of a mobile communications device; and
data indicative of a media output status of a media output device
environment information;
passenger information;
a state of a system or device of the vehicle;
an output to the driver from a system or device of the vehicle;
information indicative of driver interaction with: a system, device or passenger of the vehicle; and
information based at least in part on a profile of the driver.

According to various, but not necessarily all, examples of the disclosure, controlling the output of information to the driver comprises one or more of:
controlling an output of information to the driver from a mobile communications device;
controlling an output of information to the driver from a media rendering device; and
controlling an output of information to the driver from a navigation device.

According to various, but not necessarily all, examples of the disclosure, the workload data is determined based at least in part on data from a first system, and wherein the control of the output of information comprises controlling the output of information from a second system different from the first system;
optionally wherein the first system comprises at least one of:
a navigation system,
a vehicle sensor system, and
an Advanced Driver Assistance System, ADAS; and
optionally wherein the second system comprises at least one of:
a mobile communication device, and
a media output device.

According to various, but not necessarily all, examples of the disclosure, the workload of the driver compromises at least one of:
a visual workload of the driver;
an auditory workload of the driver; and
a cognitive workload of the driver.

According to various, but not necessarily all, examples of the disclosure, the method further comprises:
receiving a set of context data indicative of one or more contexts, wherein each context is associated with a quantitative measure of at least one of: the visual workload of the driver, the auditory workload of the driver, and the cognitive workload of the driver; and
wherein determining the workload data comprises determining, for each context of the set of context data, a quantitative measure of at least one of: the visual workload of the driver, the auditory workload of the driver, and the cognitive workload of the driver.

According to various, but not necessarily all, examples of the disclosure, the control data is configured to modify the output of information to the driver in order to mitigate against overloading the driver.

According to various, but not necessarily all, examples of the disclosure, the control data is configured to, at least one selected from the group of:
delay or expedite the output of the information, or a visual and/or auditory component thereof;
suppress the output of the information, or a visual and/or auditory component thereof;
modify a prominence of the output of the information, or a visual and/or auditory component thereof;
modify the output of the information, or a visual and/or auditory component thereof;
transform a modality of the output of the information, or visual and/or auditory component thereof; and
generate information to be output to the driver.

According to various, but not necessarily all, examples of the disclosure, generating control data comprises inputting the workload data in to a model; and wherein the model is configured to:
receive, as an input, the workload data,
correlate and/or perform a mapping of the workload data to one or more instructions for controlling the output of information, and
output control data indicative of the one or more instructions for controlling the output of information.

According to various, but not necessarily all, examples of the disclosure, the method further comprises transmitting, from a server to an in-vehicle system, the control data.

According to various, but not necessarily all, examples of the disclosure, the method further comprises controlling the output of information to the driver based at least in part on the control data.

According to various, but not necessarily all, examples of the disclosure, there is provided an apparatus comprising means for performing the above methods.

According to various, but not necessarily all, examples of the disclosure, there is provided a computer program comprising instructions which, when executed by a computing device, cause the computing device to carry out the above methods.

According to various, but not necessarily all, examples of the disclosure, there is provided a computer readable storage medium encoded with instructions that, when performed by a processor, performs the above methods.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION OF THE DRAWINGS

Some examples will now be described with reference to the accompanying drawings in which.

Figure 1:
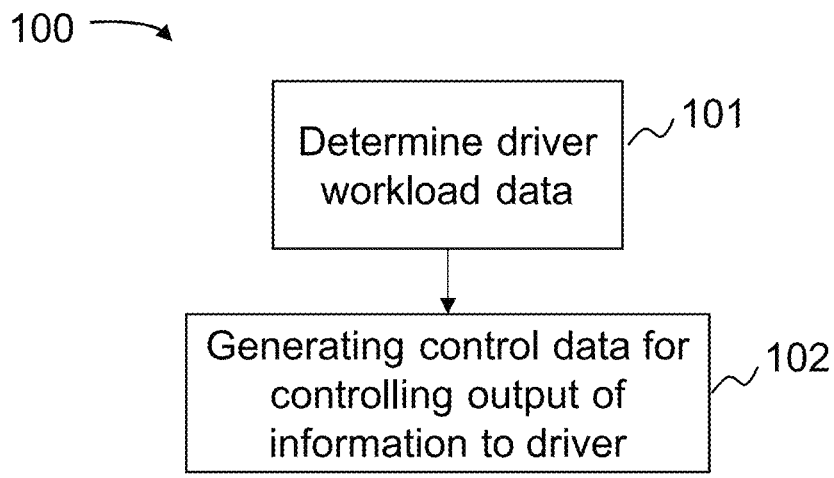
FIG. 1 shows an example of a method according to the present disclosure.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

DETAILED DESCRIPTION

By way of a broad overview, and as will be set out in greater detail below, various examples of the disclosure seek to control the output of information to a driver of a vehicle (such information output being via one or more in-vehicle user output devices—not least such as a user output device integrated into the vehicle or a user output device associated with the vehicle e.g. a portable communications device of the driver). Such control may comprise controlling: which, how, if, and when information is to be output to the driver based on a set of data collected by in-vehicle sensors and devices. The set of data may comprise a set of sensor information and/or context information. The sensor information and/or context information may be related to: the driver, the vehicle (including vehicle systems, sub-systems and devices, as well as the one or more in-vehicle user output devices), a journey, a route for the journey, and the weather (e.g. current weather during the journey). In some examples, a workload of the driver is determined based on such a set of data, and the output of information to the driver is controlled based on the workload of the driver. For instance, if it were determined that the driver is currently experiencing a high workload (i.e. a workload in excess of a threshold value, such as due to driving the vehicle in difficult driving conditions), the output of information (e.g. a notification of a received communication message) may be controlled so as to suppress or delay the output of the information (e.g. until such time as the driver's workload is determined to be below a threshold value). In such a manner, the output of information to the driver is adjusted/modified so as to enhance safety.

Some examples of the disclosure seek to orchestrate the output of information to the driver in a manner so as to avoid overloading the driver (e.g. avoiding visual and auditory sensory overload as well as cognitive overload of the driver). This may thereby reduce/prevent a degrading of the driver's performance of one or more tasks, not least the driver's primary task of driving the vehicle. Examples may thereby improve driver safety.

FIG. 1 schematically illustrates a flow chart of an example of a method 100 for controlling an output of information to a driver of a vehicle. The component blocks illustrated in FIG. 1 can represent actions in a method, functionality performed by an apparatus, and/or sections of instructions/code in a computer program. The blocks of FIG. 1 are functional and the functions described can be performed by a single physical entity (such as the apparatus as described with reference to FIG. 6). The functions described can also be implemented by a computer program (such as is described with reference to FIG. 7).

In block 101, workload data, indicative of a workload of the driver, is determined.

As used herein, the term "workload of the driver" can be used to denote a metric of a demand on the driver's attention/concentration. The term may be used to denote a quantitative measure of a demand/loading/utilisation of the driver's resources (e.g. the driver's visual, auditory and cognitive resources) such as due to the context and/or the driver performing one or more tasks. Such contexts/tasks may include: the act/task of driving (i.e. controlling movement of the vehicle), following navigation instructions/route guidance from a navigation device, listening to media (e.g. music/radio) via a media rendering device, communicating with someone via a mobile communications device; operating a vehicle subsystem control device (e.g. opening a window), or talking to a passenger. The workload of the driver may correspond to at least one of: a current workload, an expected workload and a predicted workload Input data, such as context data (which includes not least sensor data indicative of values/measurements from one or more in-vehicle sensors and devices), can be used to determine (or infer/estimate/predict) a workload of the driver. In this regard, the input data can be indicative of, or used to infer, a task being performed by the driver and/or a context related to: the task, the driver, the vehicle (including vehicle systems, sub-systems and devices, as well as the one or more in-vehicle user output devices), a journey, a route for the journey as well as journey related context data (such as: weather conditions and traffic congestion during the journey/ along the route). Such contexts and task(s) contribute to and place a demand/load on the driver (i.e. they each contribute to the driver's workload) and utilise a portion of the driver's attention/resources/available workload capacity. An amount of demand/load on a driver due to differing contexts/tasks can be pre-determined/pre-defined. For example, a more complex task (whose complexity may be increased by virtue of a prevailing context) that involves a greater demand of the driver's attention/resources, can be assigned a high workload value as compared to simpler tasks. The workload requirement for a task may be influenced by context. For instance, the workload requirement for the task of driving may be influenced by context, not least such as weather conditions and traffic congestion levels. Likewise, the workload requirement for the task of following auditory navigation instructions may be influenced by context, not least such as an auditory message notification from a mobile communication device.

The input data, indicative of a particular context or a particular task, can be assigned with a workload value corresponding to the workload value associated with the respective particular context or task. Mappings of input data to workload values may be stored in a look-up table or database and used to determine a workload value based on the input data.

In some examples, the workload may be determined via the use of a model, such as a pre-programmed deterministic and/or statistical model, which outputs a workload value for a given input of input/context data.

In this regard, the determination of the workload data may comprise inputting the input/context data (such as from one or more sensors or in-vehicle systems, sub-systems and devices) into a model, wherein the model is configured to:
receive, as an input, the input/context data,
correlate and/or perform a mapping of the input/context data to a value of a workload of the driver, and
output workload data indicative of the value of the workload of the driver.

The model's correlations and/or mappings may be pre-determined/pre-programmed (such as by a manufacturer). The model may be generated via a machine learning system (e.g. using a supervised machine algorithm), that has been trained on training data, so as to determine the model's correlations and/or mappings.

In some examples, the determination of workload data indicative of a workload of the driver may comprise receiving, retrieving or obtaining workload data, e.g. from such a model.

A workload value for the driver's primary task of driving may be determined, the workload value for which may be influenced by a prevailing context. The driver may also be engaged in one or more further/secondary tasks, the workload requirement for which may likewise be influenced by a prevailing context.

Certain tasks may involve the output of information to the driver, the reception and perception of such outputted information itself utilising a portion of the driver's available attention/resources/workload capacity. Such tasks may comprise: following navigation instructions/route guidance output from a navigation device, listening to media (e.g. music/ radio) output from a media rendering device, communicating with someone via a mobile communications device, and receiving a notification of a message output from a mobile communications device.

The performance of each task has a draw on the driver's resources, i.e. adds to the driver's overall workload, which affects the driver's remaining capacity/workload for performing tasks currently being undertaken by the driver and performing tasks such as receiving (and perceiving) the output of information. As will be discussed further below, various examples seek to control the output of information so as to prevent overloading a driver, i.e. avoid a driver's workload exceeding a pre-determined threshold value. Such control is based on a determined workload of the driver.

The determination of the workload data may be based, at least in part, on context data indicative of context information. The context information may relate to a context of: the driver, the vehicle (including vehicle systems, sub-systems and devices), a journey and a route for the journey. The context information may be indicative of one or more tasks performed by the driver a certain point in time (e.g. the primary task of driving and any secondary tasks the driver is also engaged in). The context information may be indicative of the demands on the driver at a certain point in time.

The context information could be indicative of, or used to determine, an amount of demand that is required of the driver to perform the primary task of driving, e.g. a current draw on the driver's resources to drive/control the vehicle on the road. The amount of workload on the driver in this regard could be influenced by factors and contexts (which can dynamically change) not least for example such as whether: driving in the daytime or night-time, driving along familiar or new routes, driving at high or low speeds, whether coming up to a complex junction or simply going along a straight road, driving during a busy traffic situation or along non-congested roads.

The context information could additionally or alternatively be indicative of an amount of demand that is required of the driver to perform one or more secondary tasks, e.g. a draw on the driver's resources due to secondary tasks not least for example such as: listening to music, receiving and perceiving an auditory notification (such as of an incoming communication). The workload of the driver in this regard could be influenced by factors and contexts not least for example such as: current volume output level, ambient volume.

The context information may be indicative of a set of one or more individual contexts. Each individual context may be associated with a quantitative measure of a workload of the driver. For instance, the workload for a given context may be determined via a look-up table or a database with pre-determined and/or pre-defined associations/mappings of contexts to associated workload values. The workload for a given context may be determined via the use of a model, such as a pre-programmed deterministic model, which outputs a workload value for a given input of a particular context.

It will be appreciated that contexts indicative of complex/taxing tasks and high-risk/dangerous conditions/scenarios would be assigned a workload value that is higher than a workload value of contexts indicative of simple/less onerous tasks and low-risk conditions/scenarios. For instance, a work load value for driving with the following contexts: night time, sub-zero temperature and precipitation; would have a higher work load value for driving with the following contexts: daytime, mild temperature and no precipitation.

An overall workload of the driver may be determined based on a set of workload values determined from a set of contexts. For example, an overall workload of the driver may be determined by summing each of the individual workload values of each individual context of the set of contexts.

The determination of the workload data may be based, at least in part, on one or more of the following:
- map data (which may be stored locally on a navigation device of the vehicle, and which may include, not least: road and junction data, origin, destination and/or Point Of Interest (POI) data);
- traffic data (such as received from a traffic server, which may include, not least: congestion, accident, incident and/or event data);
- navigation data (which may include, not least: aspects of map data and traffic data as well as: current/historic route data; navigation guidance/instructions data; junctions/manoeuvre data, probability to miss a next instruction and cost of the new instruction (i.e. additional time/route distance of a detour), current lane, road condition, road curvature, journey information (elapsed journey time, duration of journey, time of day, day of week, season) driver's familiarity with route);
- location data (such as derived by a navigation device of the vehicle that uses positioning signals from a Global Navigation Satellite System (GNSS), such as Global Positioning System (GPS), to determine the navigation device's location. The location data may include, not least: position, altitude, speed, bearing and/or trajectory data);
- sensor data from one or more vehicle sensors (which may include, not least ADAS sensors);
- data indicative of a communication status of a mobile communications device (which may include, not least: notifications of incoming/outgoing communication (audio/visual/textual communication), information indicative of current/active communication);
- data indicative of a media output status of a media output device (which may include, not least: music/radio/podcasts/(passenger) video and volume);
- environment information (which may include information indicative of, not least: weather, surrounding environment information (e.g. via captured images of vehicle's surroundings, recognised objects such as road signs, luminance level (day/night time));
- passenger information (which may include information indicative of, not least: number of passengers, people speaking, tone of conversation, volume);
- a state of a system or device of the vehicle;
- an output (either a current/on-going output or a proposed/upcoming output) to the driver from a system or device of the vehicle (such as an in-vehicle user interface e.g. integrated UI or a removable UI such as mobile communication device));
- information indicative of driver interaction with: a system, device or passenger of the vehicle; and
- information based at least in part on a profile of the driver.

Such data sources, data and information may provide information that is informative/indicative of a workload of the driver, i.e. whilst performing the task of driving and when performing any other tasks. Such information may be context information related to: the driver, the vehicle (including vehicle systems, sub-systems and devices), a journey and/or a route; based which a workload/demand on the driver can be determined. The information/context information may be indicative of: a situation, a state, a status, a setting, a surrounding, a circumstance, a condition and/or an event of: the driver, the vehicle, journey and/or route.

In block 102, control data, for controlling the output of information to the driver, is generated wherein the control data is based at least in part on the workload data.

The generation of the control data may comprise inputting the workload data in to a model (which may be referred to herein as a "Safety Advice Model"), wherein the model is configured to:
- receive, as an input, the workload data,
- correlate and/or perform a mapping of the workload data to one or more instructions for controlling the output of information, and
- output control data indicative of the one or more instructions for controlling the output of information.

The model's correlations and/or mappings may be pre-determined/pre-programmed (such as by a manufacturer). The model may be generated via a machine learning system (e.g. using a supervised machine algorithm), that has been trained on training data, so as to determine the model's correlations and/or mappings.

The control of the output of information may comprise controlling information that was intended/proposed to be output to the driver (e.g. modifying one or more visual/auditory components thereof), and/or controlling an output device via which the information is intended/proposed to be output to the driver (e.g. causing the output device to delay or suppress outputs therefrom).

The control data may be configured to, one or more of:
- delay or expedite the output of the information (or a visual and/or auditory component thereof);
- suppress the output of the information (or a visual and/or auditory component thereof);
- modify a prominence of the output of the information (or a visual and/or auditory component thereof). In this regard, the prominence may be increased or decreased. For example, a visual component of information to be output (e.g. a navigation instruction) could be emphasised, not least by making it: larger, brighter and/or more colourful. Conversely, it could be de-emphasised by reducing the size of the visual component or otherwise attenuating/reducing the impact of the visual component. Conversely, it could be de-emphasised by hiding or reducing the size of the visual component or otherwise attenuating/reducing the impact of the visual component. An auditory component of information to be output (e.g. a navigation instruction) could be emphasised by increasing its volume or adjusting its frequency or periodicity at which it is rendered. Additionally or alternatively, other outputs of (first) information could be modified to adjust the relative prominence of the output of the (second) information. For instance, reducing a volume of music being rendered (first information) so that an auditory output of a navigation instruction (second information) is more prominent;
- modify the output of the information, or a visual and/or auditory component thereof. In some examples, this may comprise moving one or more visual components of information to be output, re-prioritising auditory components (e.g. audio streams) of information to be output; or calculate a new route, such as an easier route that is less demanding for the user to drive (e.g. involving fewer/easier junctions and manoeuvres);

transform a modality of the output of the information, or visual and/or auditory component thereof. In some examples, this may comprise transforming visual information to auditory information (for instance convert/replace visual information re. turning turn left [a left arrow] to auditory information re. turning left [voice instruction to turn left]); and generate information to be output to the driver, for example generating a notification to recommend driver hang-up a call based on a determination of the driver's workload.

The control data may be configured to modify the output of information to the driver (e.g. an output of information to the driver comprising a visual and/or auditory component or even haptic component) so as to mitigate against overloading the driver, e.g. to prevent the driver's visual/auditory/cognitive workload exceeding a pre-determined level thereby improving driver safety. For example, if it were determined that the driver is currently experiencing a high workload (i.e. a workload in excess of a first threshold value), the output of information (e.g. a notification of a received message—the output of which, and driver perception of the same, would itself be associated with a driver workload value) may be controlled so as to suppress or delay the output of the information, e.g. until such time as the driver's current workload is determined to be below the first threshold value. In such a manner, the output of information to the driver is adjusted/modified so as to avoid overloading the driver and thereby enhancing safety. Alternatively, if it were determined that the driver is currently experiencing a low workload (i.e. a workload less than a second threshold value), the output of information (e.g. a notification of a received message) may be controlled so as to increase a prominence of the outputted information. In such a manner, the output of information to the driver is adjusted/modified so as to make it more noticeable by the driver and make optimal use of the driver's available workload capacity/capability.

Figure 2:
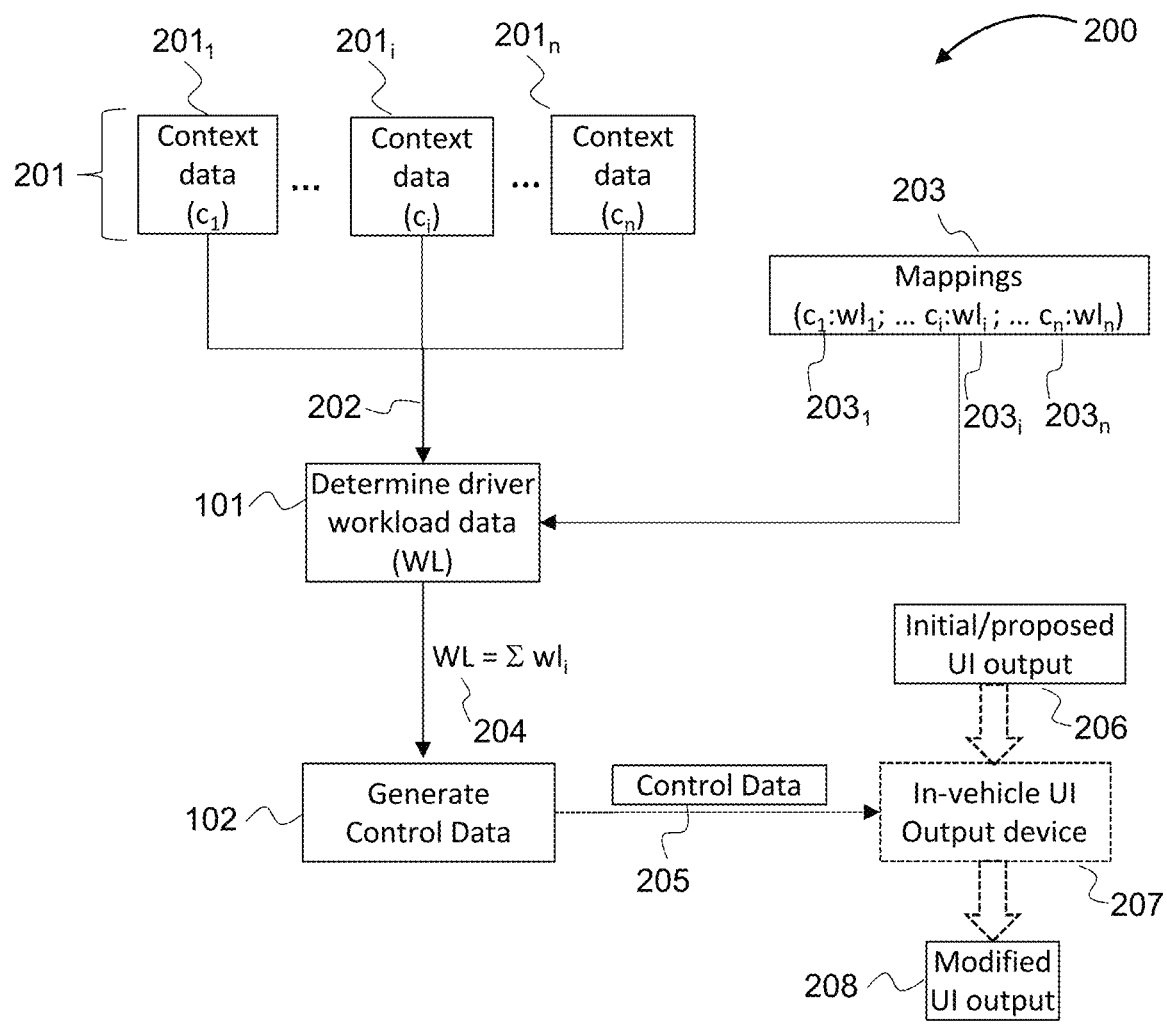
FIG. 2 shows another example of a method according to the present disclosure.

FIG. 2 schematically illustrates a flow chart of a further example of a method 200 for controlling an output of information to a driver of a vehicle. The component blocks illustrated in FIG. 2 can represent actions in a method, functionality performed by an apparatus, and/or sections of instructions/code in a computer program.

In this example, a determination of the workload data is based, at least in part, on a set of context data 201 ($201_1$-$201_n$) indicative of a plurality of contexts $c_1$-$c_n$. The set of context data and the plural contexts indicated thereby may correspond to the input data/context data discussed above with respect to FIG. 1. The contexts may be related to:
one or more contexts of the driver,
one or more contexts of the vehicle (or systems/sub-systems/devices of the vehicle) of the driver, and/or
one or more contexts of a journey/route being driven by the driver.

In block 202, the set of context data is received (e.g. from in-vehicle systems/sub-systems, sensors and devices—not shown). The context data may provide current or substantively real-time context(s)/context information, based on which a current workload on the driver can be determined.

Each context data $201_1$-$201_n$, of the set of context data 201, is indicative of a context $c_1$-$c_n$, and, via mappings 203, each context is associated with a quantitative measure of workload of the driver. In this example, the mappings 203 are embodied as a look-up table or database that sets out pre-determined/pre-defined associations/mappings $203_1$-$203_n$ between each context $c_1$-$c_n$ and its respective value of workload $wl_1$-$wl_n$, i.e.:
association/mapping $203_1$—($c_1$:$wl_1$)
association/mapping $203_i$—($c_i$:$wl_i$)
. . .
association/mapping $203n$—($c_n$:$wl_n$)

For example, context data indicative of a context of the driver driving in a busy traffic situation (such context data being based on from traffic data from a traffic server) may be associated with a workload value x. For example, context data indicative of the driver following route guidance/navigation instructions (such context data being based on route guidance/navigation instructions being output from a navigation device) may be associated with a workload value y.

In block 101, a value of the driver's overall workload WL 204 is determined based on the received set of context data 201 and the mappings 203. In this regard, individual component worklist values $w_i$, may be determined for each context $c_i$, and the overall workload WL may be determined based on the individual component worklist values $wl_i$. For instance, the overall workload WL may comprise a sum of the component worklist values $wl_i$, i.e. $WL=\Sigma_i^n wl_i$ In other examples, the workload/driver work load data may be determined from a model, which may be pre-programed by a manufacturer, e.g. with pre-determined quantitative measures of workloads $wl_i$, for various context data 201/contexts c), and configured to output an overall workload WL of the driver for a given input of a set of context data 201 ($201_1$-$201_n$) indicative of plural contexts $c_1$-$c_n$.

In block 102 control data 205 for controlling an output of information to the driver, is generated based at least in part on the determined workload WL 204. The control data may be generated in a manner similar to that described with respect to FIG. 1, not least such as via a trained machine learnt model.

The control data 205 is sent to an in-vehicle user interface (UI) output device 207. The in-vehicle UI output device 207 is configured to output (e.g. render, display) information 206, namely an initial/proposed ("pre-modified") UI output 206. In some examples, the in-vehicle UI output device 207 may be one or more of:
a mobile communications device (not least such as portable or an integrated mobile communications device);
a media rendering device (not least such as a portable or an integrated in-vehicle media rendering device, wherein the media may be audio and/or video content); and
a navigation device (not least such as portable or an integrated in-vehicle navigation device).

In some examples, the control data may adjust a look and feel of a UI output device. For instance, a font size could be adjusted (i.e. enlarged) across one or more or all UI output devices.

In step 102, the control data is generated so as to provide instructions/commands to control the output of information. In this regard, the control data may control the information to be output (e.g. control the in-vehicle UI output device 207 such that an initial/proposed ("pre-modified") UI output 206 is modified or adjusted such that a modified UI output 207 is output) or control the manner in which information is output (e.g. control the in-vehicle UI output device 207 such that an output of an initial/proposed ("pre-modified") UI output 206 is blocked/prevented/suppressed/delayed.

The in-vehicle UI output device 207 control the output of information in accordance with the control data.

In some examples, the initial/proposed ("pre-modified") UI output 206 may be one or more of:
- a notification of an incoming communication (e.g. an audio/video/text communication);
- a current/active communication (e.g. a phone call); and
- media to be rendered/currently being rendered (e.g. audio and/or video content, not least for example: music/radio/podcasts and video—such as video for a passenger on a passenger's media rendering device)

In some examples, the determined workload of the driver comprises a visual component, an auditory component and a cognitive component. In this regard, each of: a visual workload of the driver; an auditory workload of the driver; and a cognitive workload of the driver may be determined.

The mappings 203 may provide, for each context data $201_i$/context $c_i$ of a set of context data 201, a pre-determined/pre-defined mapping to an appropriate value/estimate of each of: a visual workload of the driver; an auditory workload of the driver; and a cognitive workload of the driver, i.e. (c): $vwl_i$, $awl_i$ and $cwl_i$). in this regard, values of sub-components of workload, in each of the visual/auditory/cognitive domains—$vwl_i$, $awl_i$ and $cwl_i$, are determined. For instance, for a particular context data $201_i$ indicative of a particular context $c_i$, values of: a visual workload $vwl_i$, an auditory workload $awl_i$ and a cognitive workload $cwl_i$ are determined. In which case, the table/database/mapping 203 or model may provide:

association/mapping $203_1$—($c_1$: $vwl_1$, $awl_1$, $cwl_1$)
association/mapping $203_i$—($c_i$: $vwl_i$, $awl_i$, $cwl_i$)
. . .
association/mapping $203_n$—($c_n$: $vwl_n$, $awl_n$, $cwl_n$)

The overall workload WL 205 may itself thereby have a visual component, and auditory component and a cognitive component, i.e.:

$$WL(v,a,c) = \Sigma_i^n vwl_i, \Sigma_i^n awl_i, \Sigma_i^n cwl_i = WLv, WLa, WLc$$

In some examples, a programmed/trained model may be used that is configured to output workload values for the driver in each of the visual/auditory/cognitive domains, i.e. it outputs WLv, WLa, WLc upon input of the set of context data 201.

By determining the workload values for the driver in each of the visual/auditory/cognitive domains, a greater degree of refinement and enhancement of the control of the output of information may be achieved that takes into account the driver's: visual workload WLv, auditory workload WLa and/or cognitive workload WLa.

For instance, consider the following scenario wherein it is determined that that driver's current auditory workload WLa is already close to a pre-determined threshold. Such a determination may be based on receipt of a set of context data indicating that: the vehicle's radio is playing, the driver is having a hands-free voice call, and a passenger is talking (each such context contributing to the driver's overall auditory workload). If there were subsequently to be further/new information to be output to the driver via an auditory output device of the vehicle (e.g. a spoken navigation guidance instruction) then, in view of the driver's high auditory workload, such further/new information to be output could be modified so as to prevent the driver's auditory workload exceeding the pre-determined level. For example, the information that was to be output as an auditory output could be transformed to change its modality to become a visual output (in this scenario, a visual navigation guidance instruction corresponding to the auditory/spoken navigation guidance instruction). This thereby avoids the initially proposed auditory output (the aural reception and perception of which would have added to the driver's auditory workload), and hence avoids the driver's overall auditory workload/capacity from being overwhelmed/overloaded. Alternatively, rather than modifying the output of the further/new information to be output to the driver (e.g. a spoken navigation guidance instruction), instead one of the pre-existing outputs of information could be modified, e.g. the vehicle's radio could be reduced in volume or muted. This too could avoid the driver's overall auditory workload/capacity from being overwhelmed/overloaded.

There now follows a discussion of an implementation of a method for controlling an output of information to a driver. The method may be performed by a computing device (for example a software subsystem of an in-vehicle device, not least such as a device residing in a dashboard of a vehicle).

Various inputs (which may be equated to a set of context data 201 as discussed above) are continuously collected by the computing device. The inputs collected are those which inform/enable an inference of a current load of: a driving task, a state/experience of the driver as well as a load imposed on the driver by in-vehicle systems. In other words, the inputs that are collected are those that effect a workload of the driver and hence which can be used to determine/estimate a workload of the driver.

The inputs may be from many differing sources, not least such as:
- the vehicle, and sub-systems/devices and sensors thereof
- a navigation device of the vehicle (which may provide: map data, position/location data and/or traffic data)
- a portable wireless communications device of the driver (not least such as the driver's smart phone)
- a remote server (e.g. traffic server for providing traffic data, map server for providing map data, weather server for providing weather data)

The collected inputs may comprise data indicative of, not least:
- a location/position, map objects (e.g. not least: roads, locations, POI . . . ) from map data
- environment (weather: fog/storm/snow/rain/sunny)
- road (such as related to a quality or surface of the road, or any events/objects associated with the road e.g. accidents, speed limit changes, speed cameras)
- traffic density
- recognized traffic signs (from car sensors)
- images captured by car cameras
- being in trajectory control segment
- a probability of driver missing a route instruction
- cost (e.g. time/distance/fuel) of driver missing a route instruction
- blinker status
- ADAS blind spot sensor, front car distance, etc.
- current lane (fast/slow, left/right)
- distance to next instruction/exit
- actual speed
- whether a fuel tank is empty/car needs charging
- whether the driver is in a call/meeting
- whether the driver is speaking
- whether the driver is operating car controls (throttle, brake, wipers, indicators, audio volume)
- local maximum speed for the vehicle's location
- cruise control status
- radio/media playing (and volume)
- number of people in the car, multiple people speaking, tone of conversation, volume time of day, day/night, day of week, season (winter/summer), working day, weekend, day off driver route history, number of times the driver has driven along road/route before, and how recently road condition: rain/ice, precipitation any incidents ahead road slope (up, down, angle)

curve/bridge/crossing/complexity ahead messages received from social media/phone historic events of the car/driver local events (bound to location)

The above-mentioned inputs relate to events, signals and sensor data that are indicative of an imposed load on drivers' current capacity, i.e. are indicative of the driver's workload.

The inventors have appreciated that the driver's capacity could possibly be overloaded in the following three independent areas:

Visual load (i.e. due to the driver receiving and perceiving an excessive number of graphical signals and visual events)

Auditory load (i.e. due to the driver receiving and perceiving an excessive amount pf auditory signals and auditory events. The complexity and volume of the sound can also effect the auditory load on the driver)

Cognitive load (i.e. due to the driver: performing an excessive amount of hard thinking, decision making as well as the driver being in complex situation)

The inventors have appreciated that each input may have a contribution on the driver's: visual load, auditory load and cognitive load.

Values of each of a: visual load "V", auditory load "A" and cognitive load "C" are assigned/associated with each input, for example as shown in table 1 below (which may be pre-programmed, such as by a car manufacturer):

TABLE 1 pre-programmed table to map/translate inputs to: visual, auditory and cognitive loads

|  | V<br>Visual load | A<br>Auditory load | C<br>Cognitive |
|---|---|---|---|
| Active Call | 0 | 3 | 2 |
| Voice assistant | 0 | 3 |  |
| SMS incomming | 3 | 2 | 2 |
| Complex Junction | 1 | 0 | 3 |
| Busy Traffic situation | 2 | 0 | 3 |
| Instruction Navigation | 1 | 2 | 2 |
| ... | ... | ... | ... |

Once the set of inputs have been collected and scaled/normalized, and each input of the set is mapped to one of the three areas (i.e. the three load domains: visual, auditory and cognitive). A total load per area (i.e. total visual load "TVL", total auditory load "TAL", and total cognitive load "TCL") can be computed.

In some examples, the total load per area can be an average of the individual sub-component loads of each input for a given area. For example:

a value of the total visual load may be an average of all the visual load values V for a set of inputs (i.e. TVL=$\bar{V}$)

a value of the total auditory load may be an average of all the auditory load values A for the set of inputs (i.e. TAL=$\bar{A}$); and a value of the total cognitive load may be an average of all the cognitive load values C for the set of inputs (i.e. TCL=$\bar{C}$).

In some examples, the total load per area can be a maximum value of the individual sub-component loads of each input for a given area. For example:

a value of the total visual load may be a maximum value of all the visual load values V for a set of inputs (i.e. TVL=max(V));

a value of the total auditory load may be a maximum value of all the auditory load values A for the set of inputs (i.e. TAL=max(A)); and a value of the total cognitive load may be a maximum value of all the cognitive load values C for the set of inputs (i.e. TCL=max(C)).

A car manufacturer may determine/choose/select the set of inputs that are to be used. The car manufacturer may determine/choose/select/pre-define/calculate values of V, A and C to be associated with each input. The car manufacturer may also determine the manner in which a total load per area is to be calculated. For example, the total load per area may be calculated using a combination of the above-mentioned average and maximum values of the individual sub-component loads of each input for a given area. A car manufacturer may apply and adjust certain settings so as to program and influence the calculations.

Following the receipt of plural pieces of data from plural data sources (such as the above-mentioned data sources), that are used to determine the plural inputs (such as the above-mentioned input), which themselves are used to determine values (which may be scaled/normalized) of each of: a total visual load, a total auditory load and a total cognitive load; such determined values of TVL, TAL and TCL are applied to a model to determine how an output of information to the driver is to be controlled (e.g. to determine: which, how, if, and when information is to be output to a driver based on the TVL, TAL and TCL).

The features and functionality discussed above in relation to FIG. 2 can be considered to illustrate a plurality of methods, in the sense that FIG. 2 can be considered to illustrate one or more actions performed by/at a plurality of actors/entities. FIG. 2 can therefore be considered to illustrate a plurality of individual methods performed by each respective individual actor/entity of the plurality of the actors/entities. For instance, the input context data may be determined (e.g. created/measured/sensed/retrieved/received) from one or more devices/data sources (such as one or more in-car systems, not least such as: a sensor of the vehicle, a navigation system, an Advanced Driver Assistance System (ADAS), a mobile communication device (e.g. a smart phone, or tablet device), a media output device (e.g. mobile/portable media renderer). Steps 101 and/or 102 could be performed locally at the vehicle (e.g. a device/system or subsystem of the vehicle). Alternatively, one or both of these steps could be performed remotely of the vehicle (e.g. by a server/in the cloud), wherein the locally collected input/context data is transmitted to the server/the cloud which uses the same to generated control data that is transmitted to an in-vehicle UI output device to control its output of information.

In some examples, the workload data is determined based at least in part on data from a first system, and the control of the output of information comprises controlling the output of information from a second system different from the first system. The first system may comprise at least one of:
- a navigation system,
- a vehicle sensor system, and
- an Advanced Driver Assistance System, ADAS.

The second system may comprise at least one of:
- a mobile communication device, and
- a media output device.

In such a manner, the UI output system that is controlled is a different system to the system which provides the input data/context data from which the workload is determined. In some examples, the input data/context data from which the workload is determined is data that is not intended to be output to the driver, i.e. the input data/context data e.g., is not-UI output data.

The flowchart of FIG. 2 represents one possible scenario among others. The order of the blocks shown is not absolutely required, so in principle, the various blocks can be performed out of order. Not all the blocks are essential. In certain examples one or more blocks can be performed in a different order or overlapping in time, in series or in parallel. One or more blocks can be omitted or added or changed in some combination of ways.

It will be understood that each block (of the flowchart illustrations and block diagrams), and combinations of blocks, can be implemented by computer program instructions of one or more computer programs. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Figure 3:
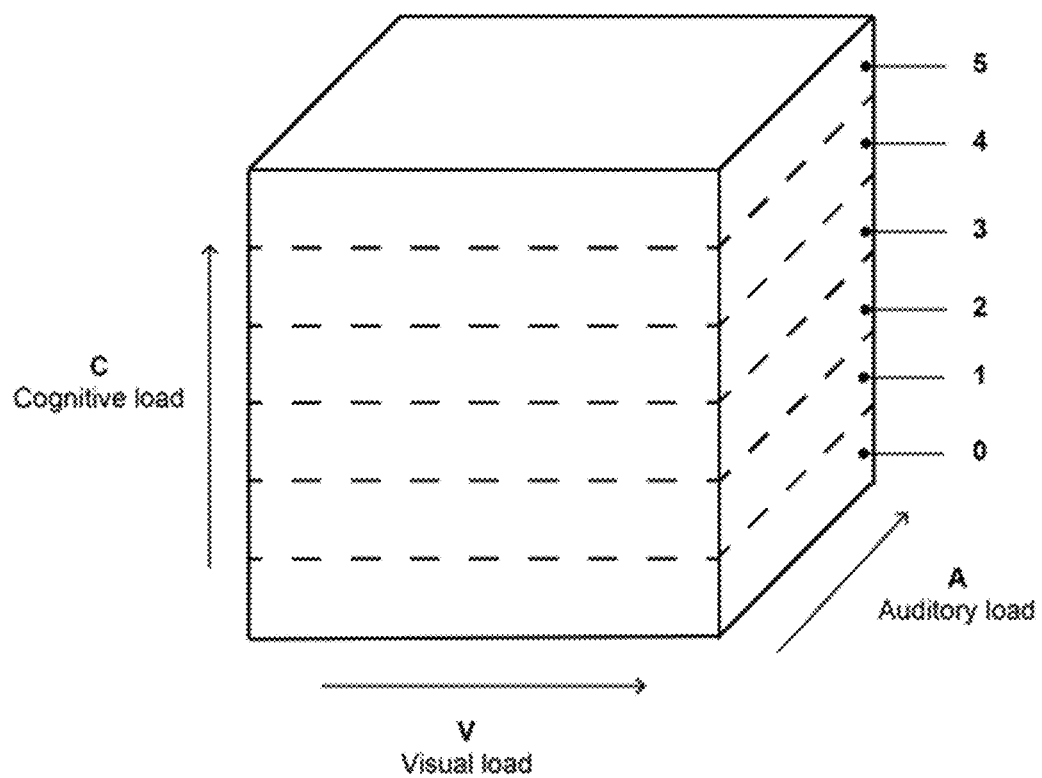
FIG. 3 shows an example of a model for use with examples of the present disclosure.

FIG. 3 schematically illustrates a model for determining how an output of information to the driver is to be controlled based on the determined values of TVL, TAL and TCL. In this regard, the model is used in the generation of control data for controlling the output of information to the driver based on: TVL, TAL and TCL.

The 3 values of TVL, TAL and TCL can be considered independently and projected into a "3D advice model" as shown in FIG. 3 and FIGS. 4A-4F. Here the 3D advice model is representative of values of TVL, TAL and TCL in a 3D TVL/TAL/TCL space (which is represented as a 3D TVL, TAL, TCL cube as shown in FIG. 3).

The values of TVL (represented via an x axis of the 3D model/matrix cube) may be scaled/normalized so as to range from 0 to 100. The values of TCL (represented via a y axis of the 3D model cube) may be scaled/normalized so as to range from 0 to 5. The values of TAL (represented via a z axis of the 3D model cube) may be scaled/normalized so as to range from 0 to 100. The higher the number the greater the degree of loading in the respective area/domain (visual, auditory or cognitive). The uppermost value of the range for a given area/domain may correspond to a state of driver overload/saturation of load for the given area/domain.

For simplicity, this 3D model can be simplified to a number of slices (as shown in FIGS. 4A-4F), so the 3D cube can be treated as a number of 2D graphs (also called matrix) as slices. In this regard, each slice can be considered as a plane in the 3D TVL/TAL/TCL space that is defined by a constant TCL (i.e., with respect to the example of FIGS. 4A-4F, a TCL value of 0, 1, 2, 3, 4 or 5).

Figures 4A, 4B:
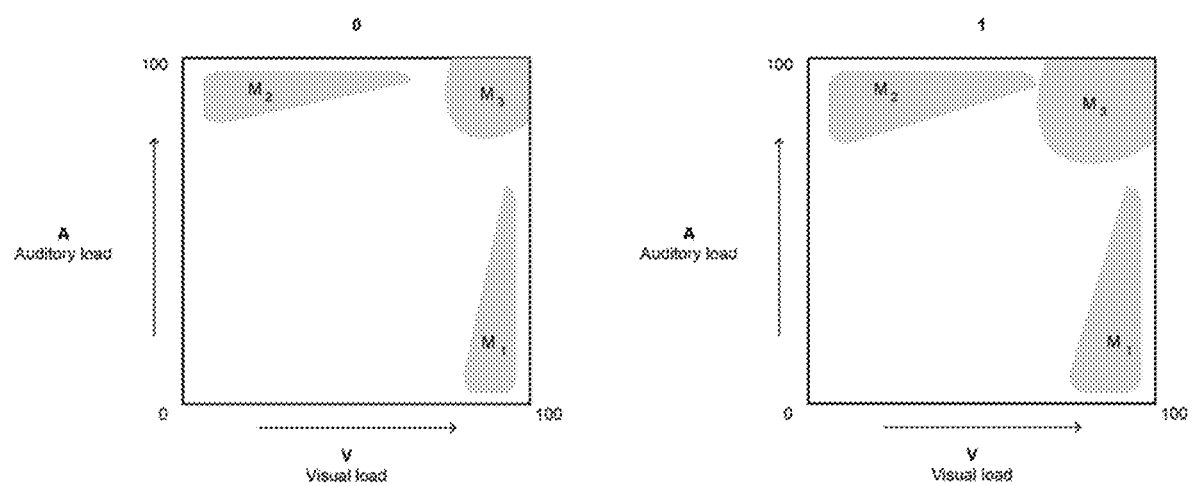
FIGS. 4A-4F show another example of a model for use with examples of the present disclosure.

FIG. 4A shows the matrix slice of TVL and TAL for TCL=0.

FIG. 4B shows the matrix slice of TVL and TAL for TCL=1.

Figure 4C:
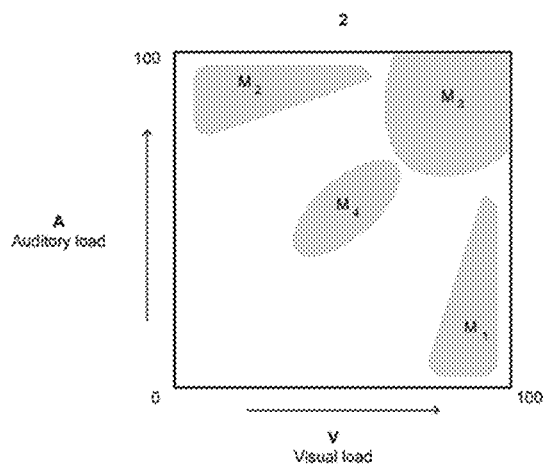

FIG. 4C shows the matrix slice of TVL and TAL for TCL=2.

Figure 4D:
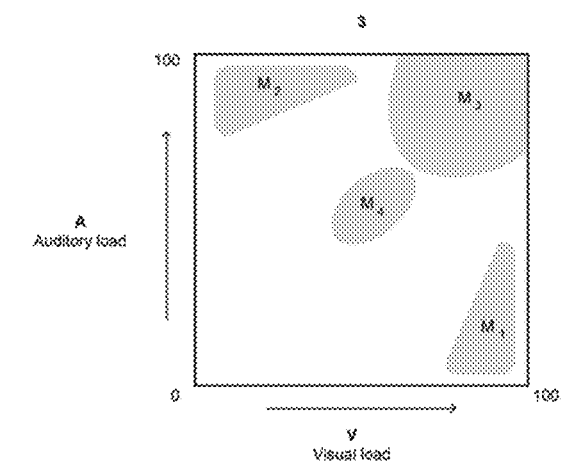

FIG. 4D shows the matrix slice of TVL and TAL for TCL=3.

Figure 4E:
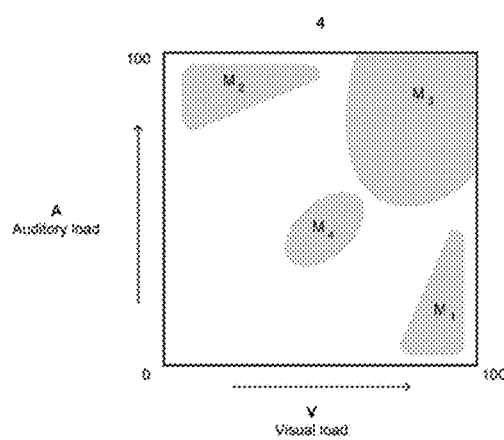

FIG. 4E shows the matrix slice of TVL and TAL for TCL=4.

Figure 4F:
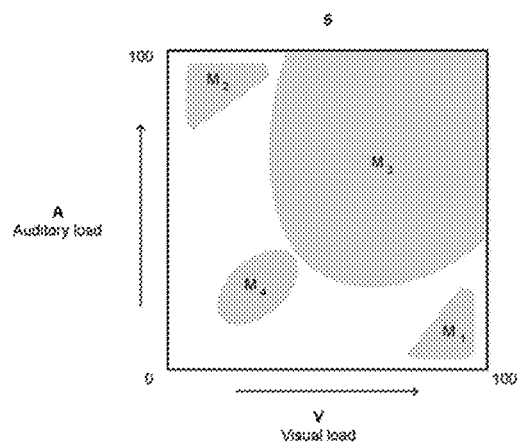

FIG. 4F shows the matrix slice of TVL and TAL for TCL=5.

Within each slice (i.e. in the TVL, TAL plane with constant TCL), a plurality of regions are defined: M1, M2, M3 and M4. Each region corresponds to a set of ranges of values of TVL, TAL and TCL. The position and size/extent of each region defines a range of values of TVL, TAL and TCL associated with/represented by each region. The size/extent and/or position of each region (in the TVL/TAL domain) changes with varying TCL. Moreover, the number of regions may change with varying TCL.

In the particular example illustrated in FIGS. 4A-4F:
region M1 generally corresponds to high values of TVL combined with low to mid-level values of TAL,
region M2 generally corresponds to high values of TAL combined with low to mid-level values of TVL,
region M3 generally corresponds to high values of TVL combined with high values TAL; and
for TCL≥2 a new region M4 is provided/created, wherein region M4 generally corresponds to mid-level values of TVL combined with mid-level values TAL.

As TCL increases:
the size of region M1 decreases,
the size of region M2 decreases,
the size of region M3 increases, and
the size of region M4 decreases and its position moves so as to correspond to lower values of TVL and TCL.

As will be apparent from FIGS. 4A-4F, as the TCL increases, the size and/or position of the region changes, such that the range of values of: TVL and TAL encompassed in a given region changes. For example, the M3 region of FIG. 4A, corresponds to: values of TVL from approximately 75 to 100; values of TAL from approximately 75 to 100, and a TCL value of 0. Whereas, the M3 region of FIG. 4F, corresponds to: values of TVL from approximately to 100; values of TAL from approximately 30 to 100, and a TCL value of 5.

It will be appreciated that the number of slices, and (scaled/normalized) range of values can be arbitrary. They can be selected based on simplicity or ease of understanding and/or can be set (e.g. by a car manufacturer) so as to suit a particular application/implementation. Also, the number of regions, as well as their size and position (i.e. ranges of values of TVL, TAL and TCL each region represents) can be set so as to suit a particular application/implementation.

Each region is associated with "user interface advice/command", i.e. a set of one or more controls of the output of information to the driver. For instance, instruction/command data to control a user interface output device's output of information (such a user interface output device may be, not least for example, an In-Vehicle Infotainment (IVI) system, a navigation device, or a portable wireless communication device of the driver. The set of controls for each region may be appropriately selected to suit the driver's present workload/state/condition (i.e. as represented by current values of TVL, TAL and TCL for the driver) and overloading the driver in one or more areas.

For example, if the driver's current values of TVL, TAL and TCL correspond to:

region M1—this is indicative of the driver having a high visual load and low auditory load, i.e. the driver has auditory load capacity but little/no visual load capacity. Accordingly, one or more UI output controls associated with M1 may be controls for reducing the driver's visual load, e.g. suppressing/delaying/reducing the number of visual outputs and/or outputting auditory information instead of visual information (e.g. providing spoken navigation instructions instead of displaying visual navigation instructions)

region M2—this is indicative of the driver having a high auditory load and low visual load, i.e. the driver has visual load capacity but little/no auditory load capacity. Accordingly, one or more UI output controls associated with M2 may be controls for reducing the driver's auditory load, e.g. suppressing/delaying/reducing the number/reducing the volume of auditory outputs and/or outputting visual information instead of auditory information (e.g. displaying visual navigation instructions instead of using spoken navigation instructions)

region M3—this is indicative of the driver having high visual and auditory loads, i.e. the driver has little/no visual or auditory load capacity. Accordingly, one or more UI output controls associated with M2 may be controls for reducing the driver's visual and auditory loads.

region M4—this is indicative of the driver having mild/mid-level visual and auditory loading, i.e. the driver has some visual and auditory load capacity. Accordingly, one or more UI output controls associated with M2 may be controls for reducing the driver's visual and auditory loads, but to a lesser degree/severity that that of M3.

Such controls may control the output of information, not least visual or audio information (e.g. visual/auditory signals or notifications) to improve safety. The controls may comprise, not least for example:

Reduce audio (e.g. for low importance/low priority auditory signals which may decrease their prominence and reduce an auditory load on the driver)

Amplify audio (e.g. for important/high priority auditory signals which may increase their prominence and aid their perception by a user)

Delay non urgent notifications (e.g. for the output of low importance/low priority information which may reduce a load on the driver)

Suppress notifications (e.g. for the output of low importance/low priority information which may reduce a load on the driver)

Move/transform audible signals to visual signals (which may reduce an auditory load on the driver)

Move/transform visual signals to audible signals (which may reduce a visual load on the driver)

Enlarge or emphasize visual signals (e.g. for important/high priority visual signals which may increase their prominence and aid their perception by a user)

Shrink or attenuate visual signals (e.g. for low importance/low priority visual signals which may decrease their prominence and reduce a visual load on the driver)

In some examples, the information to be output may be assigned/associated with a particular category, e.g. an indication of importance, priority or class, and the control may be applicable to only certain particular categories. For instance, if it were determined that the driver is currently experiencing a high work load (i.e. a work load in excess of a threshold value), if information to be output has a first category/priority class 1, the output of such information may be controlled so as to increase the prominence of such information (to aid its reception and perception by the driver. Whereas, if the information to be output had a second category/priority class 2, the output of such information may be controlled in a different manner, i.e. so as to decrease the prominence of such information or prevent/suppress/delay its output (e.g. until such time as the driver's workload is determined to be below the threshold value).

In some examples, the input/context data is associated with a time parameter, e.g. a time period or duration in which the input/context is extant. The time period may be indicative of a validity period or expiration period of the input/context, i.e. an indication as to how long the input/context persists for (i.e. to distinguish short-lived/ephemeral inputs/context [e.g. an SMS text notification] from those that last longer [e.g. poor weather conditions]). The time period may also be used to identify inputs/contexts that are time-shared, i.e. extant in at the same time.

The determination of the workload and/or generation the control data may further be based at least in part on the time parameter.

A driver and/or the vehicle manufacturer can specify their preferences or weighing factors that influence the model's outputted controls/suggested advice for controlling the output of information to the driver.

In such a manner, each region M1, M2, M3 and M4 can be equated to an 'advice code' which is indicative of advice (i.e. control data indicative of a set of one or more commands/instructions for controlling the output of information to the driver) for various combinations of values of TVL, TAL and TCL.

Essentially, by determining values of TVL, TAL and TCL for a driver (which is determined/calculated based on input data such as the above-described inputs and context data) and inputting the same into the model, the model is configured to output an advice code (M1, M2, etc.) for the given values of TVL, TAL and TCL, wherein the advice code is indicative of how a user output device is to adjust how it outputs information to the driver to improve safety.

Figure 5:
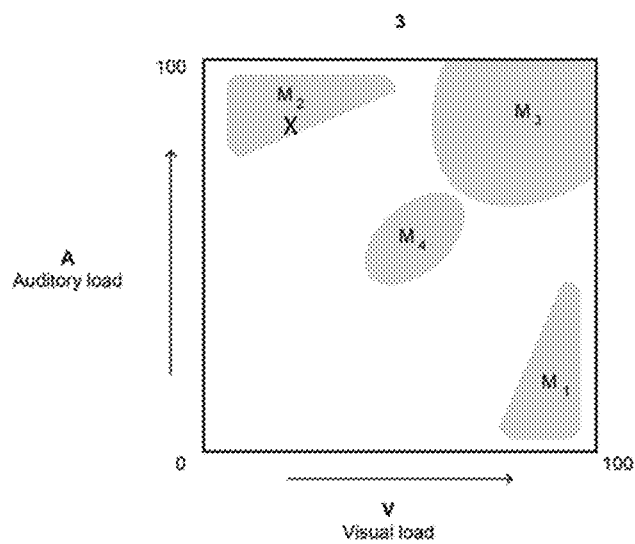
FIG. 5 shows another example of a model for use with examples of the present disclosure.

FIG. 5 shows an example use of the model of FIGS. 4A-4F for controlling the output of information to a driver.

Workload metrics for the driver are determined, as discussed above, namely determination of: a visual load metric, an auditory load metric, and a cognitive load metric (i.e. TVL, TAL, and TCL).

The model (which may be referred to as a "Safety Advice Model") takes, as an input, a cognitive load metric of the driver (e.g. a TCL value for a driver) and selects an appropriate "slice" of the 3D model/matrix cube associated with the given the cognitive load metric.

In this particular example, the cognitive load metric=3, and hence the slice/matrix of FIG. 4D is selected.

As discussed above, the slice/matrix (as part of the 3D model) has been pre-programmed by the manufacturer of the driver's vehicle so as to output advice (i.e. commands/instructions for controlling the output of information to the driver to improve safety) for various combinations of visual load, auditory load, and cognitive load metrics.

The system then uses the auditory load and visual load metrics to determine an appropriate advice code for the combination of metrics.

In this particular example, the driver is determined to have:
a visual load of 22%
an auditory load of 85%, and
a cognitive load of 3.

This set/combination of particular values of load is marked with "X" in FIG. 5, which is positioned with a particular region—in this case a region coded as M2 which is associated with particular advice (e.g. a set of controls, instructions, commands or guidance) for controlling the output of information to the driver. The model is there configured to output an advice code M2 for the inputted: visual, auditory and cognitive load of the driver. In such a manner, the outputted advice code can be equated to control data for controlling the output of information to the driver based at least in part on workload data (i.e. TVL, TAL, and TCL).

Optionally, the outputted advice/advice code is also accompanied by a strength metric (e.g. 1-100) that indicates how strong the advice is (e.g. where 1 is very weak and 100 is very strong). This behavioural advice, optionally with its strength metric, is used as the output of the safety advice model and is sent to a UI output device/system/subsystem, e.g. an IVI system of the vehicle.

The IVI system receives this behavioural advice and can modify its output of information (such as its flow/stream of information provided to the driver).

Examples of effects of the advice used by a UI output subsystem in the car to improve safety, given there are already systems available implementing isolated effects:
Notifications of communication or system messages
   Delay (for example, a non-urgent notification of a low tire-pressure whilst a driver is making a manoeuvre could be delayed until after the manoeuvre has been made)
   Suppress
   Turn-off sound or visual notification
Incoming call/communication
   Delay
   Suppress
   Silent
In an ongoing call/communication
   Pause suggestion: complex route ahead?
Amount of information on the screen
Music, podcasts etc.
   Turn off
   Reduce volume
Voice Assistant Talking
   Suppress
Routing complexity
   Alternative easy route (reduce complexity)
   Create visual focus on instructions
   Complexity of audio instruction
   Length of audio instruction
Passenger screen
   notification to inform passenger In some examples, a table can be pre-programmed (e.g. by a car manufacturer) into the UI output device/system, to enable the UI output device/system to determine which action should be taken as a response to each received behavioral advice, optionally taking a strength parameter into account:

| Advice | Pre-programmed effect |
| --- | --- |
| M2 | Reduce music playing sound |
| M2 | Enlarge navigation instructions |
| M1 | Louder navigation sounds |
| M1 | Simplify graphics in navigation instructions |
| M3 | Suppress all non-urgent audio and visual information |
| ... | ... |

There can be multiple effects/controls/control instructions per each input advice code.

Advantageously, examples of the disclosure may enable a load on the driver (i.e. cognitive, visual, or auditory load) to be reduced and thereby enhance the safety of the driver.

To suppress oscillations, the safety advice model may have a stability monitoring component that avoids swinging between states due to feedback of itself. For example, when the output information flow is reduced, the driver's load/stress level is reduced which frees up load capacity so as to permit the information flow to resume/grow again, which increases the driver's load/stress, causing the output information flow to be reduced . . . and so on in a loop.

There now follows several example use cases for a safety advice model which increases driver safety by using inputs, indicative of a load on the driver, to cause/control/suggest an alteration of information presented to the driver.
1. input=map data which informs that a driver is on a complex junction. The safety advice model causes visual navigation instructions to be enlarged and notifications from the driver's phone to be suspend until the turn is completed. Both alterations seek to respectively reduce the visual and cognitive load on the driver.
2. input=historic map data and driver profile information which inform that a driver is on an unfamiliar route, and vehicle system data which informs that the driver is in an active call. The safety advice model causes spoken audio instruction to be muted and replaced with a sound notification. This alteration seeks to reduce the auditive load cause by spoken instruction. At the same time, the safety advice model also causes a visual instruction to be visually enhanced to seek to reduce a visual load on the driver by aiding the driver to read/perceive the enhanced visual instruction.
3. input=in-vehicle system data which informs that the driver is in a call, map and traffic data from a traffic server which informs that the driver is heading onto a road with traffic and a hazard. The safety advice model causes the generation of a prompt/notification to recommend the driver to hang-up the call.
4. input=map and traffic data from a traffic server which informs that the driver is driving on a road with considerable traffic, in-vehicle system data which informs that the car's indicator/blinker status is on. The safety advice model causes a suspension of notifications from the driver's phone, and a delay of notifications of the car's fuel level could be delayed until the indicator/blinker status is off. The safety advice model also causes incoming calls to be silenced during this period.
5. input=map and traffic data from a traffic server which informs that the driver is driving on a road with traffic, and ADAS proximity sensor measurement data which informs that car is close by an object. The safety advice model causes information input/output to/from a UI input/output device to transfer from visual or touch input/output to audio input/output (e.g. input/output via voice dialogue using a voice assistant system). The safety advice model also causes the volume of music to be decreased, visual navigation instructions to be accompanied with audio instructions, and instead of using a touch input to reply to a call, it happens through a voice dialogue using a voice assistant system.

The safety advice model may be implemented via a software subsystem, e.g. that resides in a dashboard of the vehicle, which has access to various sources of input/context data from which workloads of the driver can be determined/inferred and use such workloads to influence the information sent to the driver, i.e. by generating control data for controlling the output of information to the driver.

The safety advice model may also be implemented remotely of the vehicle, e.g. in a server/in the cloud. For this input/context data can be collected, and optionally processed (filtering, aggregating) locally at the vehicle, and sent to the server/cloud. The outputs of the safety advice model from the server/cloud can be transmitted to an in-vehicle system of the vehicle. The technical possibilities, and processing capabilities, in the cloud may be greater and richer than those locally in the vehicle (e.g. image processing and recognition capabilities may be better in the cloud).

Various examples of the present disclosure have been described in relation to determining a workload of the driver and using the workload to determine how to control an output of information to the driver. However, in some examples the determination and use a workload of the driver is not essential. In some examples, such as discussed below, the output of information to the driver may be controlled without the use of workload data. It is to be appreciated, that features and functionality discussed above with regards to examples that do make use of a workload of the driver, could be duly applied, mutatis mutandis, to examples that do not make use of a workload of the driver.

In some examples of the disclosure there is provided a computer implemented method comprising:
controlling an output, to a driver from a mobile communications device, of a notification of a received message or of an active communication based at least in part on one or more of:
map data;
traffic data;
navigation data;
location data;
sensor data from one or more vehicle sensors; and
data indicative of a media output status of a media output device.

In some examples of the disclosure there is provided a computer implemented method comprising:
controlling an output, to a driver from a media output device, of media based at least in part on one or more of:
map data;
traffic data;
navigation data;
location data;
sensor data from one or more vehicle sensors; and
data indicative of a communication status of a mobile communications device.

In some examples of the disclosure there is provided a computer implemented method comprising:
controlling an output, to a driver from a navigation device, of navigation information based at least in part on one or more of:
sensor data from one or more vehicle sensors;
data indicative of a communication status of a mobile communications device; and
data indicative of a media output status of a media output device.

In some examples of the disclosure there is provided a computer implemented method comprising:
controlling an output, to a driver from at least one of:
a mobile communication device, and
a media output device; and
wherein said controlling is based at least in part on data from at least one of:
a navigation system,
a vehicle sensor system, and
an Advanced Driver Assistance System.

Various, examples of the present disclosure can take the form of a method, an apparatus or a computer program. Accordingly, various, but not necessarily all, examples can be implemented in hardware, software or a combination of hardware and software.

It will be understood that each block and combinations of blocks illustrated in FIGS. 1 and 2, as well as the further functions, functionalities, examples and implementation described above, can be implemented by various means, such as hardware, firmware, and/or software including one or more computer program instructions. For example, one or more of the functions described above can be performed by a duly configured apparatus (such as an apparatus comprising means for performing the described functions). One or more of the functions described can be embodied by a duly configured computer program (such as a computer program comprising computer program instructions which embody the functions described and which can be stored by a memory storage device and performed by a processor).

As will be appreciated, any such computer program can be loaded onto a computing device or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Figure 6:
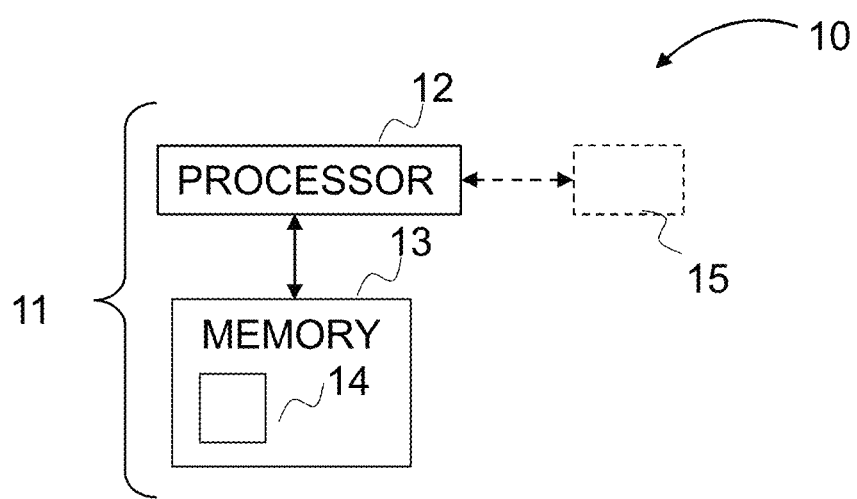
FIG. 6 shows an example of an apparatus according to the present disclosure.

FIG. 6 schematically illustrates a block diagram of an apparatus 10 for performing the methods described in the present disclosure, not least such as those illustrated in FIGS. 1 and 2, as well as effecting the above-described functionality. The component blocks of FIG. 2 are functional and the functions described can be performed by a single physical entity.

The apparatus comprises a controller 11, which could be provided within a device such as: a mobile device; a device integrated into the vehicle; a navigation device; a portable device; a media output device; and a server.

The controller 11 can be embodied by a computing device, not least such as those mentioned above. In some, but not necessarily all examples, the apparatus can be embodied as a chip, chip set, circuitry or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components (not least for example: a wireless communications transceiver, a GNSS antenna, sensors, input/output user interface elements, and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated not least with regards to FIGS. 1 and 2. The processor 12 by reading the memory 13 is able to load and execute the computer program 14.

The computer program instructions may be comprised in a computer program, a non-transitory computer readable medium, a computer program product, a machine-readable medium. In some but not necessarily all examples, the computer program instructions may be distributed over more than one computer program.

Although the memory 13 is illustrated as a single component/circuitry it can be implemented as one or more separate components/circuitry some or all of which can be integrated/removable and/or can provide permanent/semi-permanent/dynamic/cached storage. Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and illustrated not least in FIGS. 1 and 2. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

In some examples, the apparatus comprises:
at least one processor 12; and
at least one memory 13 including computer program code
the at least one memory 13 storing instructions that, when executed by the at least one processor 12, cause the apparatus at least to:
determine workload data indicative of a workload of the driver, and
generate control data for controlling the output of information to the driver based at least in part on the workload data.

The above-described examples may find application as enabling components of: automotive systems; navigation systems; telecommunication systems; electronic systems including consumer electronic products; distributed computing systems; media systems for generating or rendering media content including audio, visual and audio & visual; navigation systems; user interfaces also known as human machine interfaces and related software and services.

Figure 7:
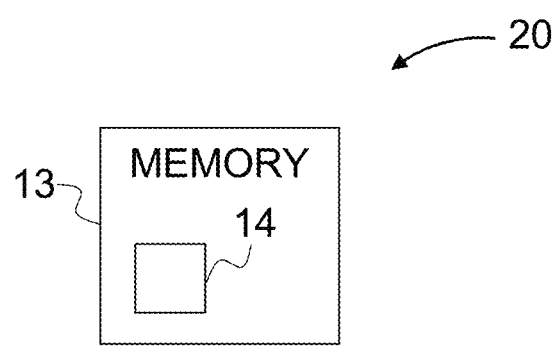
FIG. 7 shows an example of a computer program according to the present disclosure.

FIG. 7, illustrates a computer program 14 which may be conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. An apparatus can receive, propagate or transmit the computer program as a computer data signal.

In some examples of the present disclosure, there is provided computer program instructions for causing a computing device to perform at least the following:
determine workload data indicative of a workload of the driver, and generate control data for controlling the output of information to the driver based at least in part on the workload data.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not.

Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), retrieving/accessing (for example, retrieving/accessing data in a memory), obtaining and the like. Also, "determine/determining" can include resolving, selecting, choosing, establishing, and the like.

References to a parameter (for example workload), or value of a parameter, should be understood to refer to "data indicative of", "data defining" or "data representative of" the relevant parameter/parameter value if not explicitly stated (unless the context demands otherwise). The data may be in any way indicative of the relevant parameter/parameter value, and may be directly or indirectly indicative thereof.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are used with an inclusive not an exclusive meaning and are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described. In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. A method for controlling an output of information to a driver of a vehicle, the method comprising:
   determining workload data indicative of a workload of the driver, and
   generating control data for controlling the output of information to the driver based at least in part on the workload data,
   wherein the control data is configured to, at least one selected from the group of:
   delay or expedite the output of the information, or a visual and/or auditory component thereof;
   suppress the output of the information, or a visual and/or auditory component thereof;
   modify a prominence of the output of the information, or a visual and/or auditory component thereof;
   modify the output of the information, or a visual and/or auditory component thereof; and
   transform a modality of the output of the information, or visual and/or auditory component thereof.

2. The method of claim 1, wherein determining the workload data is based, at least in part, on context data, and wherein the context data is based on one or more of:
   map data;
   traffic data;
   navigation data;
   location data;
   sensor data from one or more vehicle sensors;
   data indicative of a communication status of a mobile communications device; and data indicative of a media output status of a media output device environment information;
   passenger information;
   a state of a system or device of the vehicle;
   an output to the driver from a system or device of the vehicle;
   information indicative of driver interaction with: a system, device or passenger of the vehicle; and
   information based at least in part on a profile of the driver.

3. The method of claim 1, wherein controlling the output of information to the driver comprises one or more of:
   controlling an output of information to the driver from a mobile communications device;
   controlling an output of information to the driver from a media rendering device; and
   controlling an output of information to the driver from a navigation device.

4. The method of claim 1, wherein the workload data is determined based at least in part on data from a first system, and wherein the control of the output of information comprises controlling the output of information from a second system different from the first system.

5. The method of claim 4, wherein:
   the first system comprises at least one of:
   a navigation system,
   a vehicle sensor system, and
   an Advanced Driver Assistance System, ADAS; and
   the second system comprises at least one of:
   a mobile communication device, and
   a media output device.

6. The method of claim 1, wherein the workload of the driver compromises at least one of:
   a visual workload of the driver;
   an auditory workload of the driver; and
   a cognitive workload of the driver.

7. The method of claim 1, further comprising:
   receiving a set of context data indicative of one or more contexts, wherein each context is associated with a quantitative measure of at least one of: the visual workload of the driver, the auditory workload of the driver, and the cognitive workload of the driver; and
   wherein determining the workload data comprises determining, for each context of the set of context data, a quantitative measure of at least one of: the visual workload of the driver, the auditory workload of the driver, and the cognitive workload of the driver.

8. The method of claim 1, wherein the control data is configured to modify the output of information to the driver in order to mitigate against overloading the driver.

9. The method of claim 1, wherein the control data is generate information to be output to the driver.

10. The method of claim 1, wherein generating control data comprises inputting the workload data in to a model; and
    wherein the model is configured to:
    receive, as an input, the workload data,
    correlate and/or perform a mapping of the workload data to one or more instructions for controlling the output of information, and
    output control data indicative of the one or more instructions for controlling the output of information.

11. The method of claim 1, further comprising transmitting, from a server to an in-vehicle system, the control data.

12. The method of claim 1, further comprising controlling the output of information to the driver based at least in part on the control data.

13. An apparatus, comprising:
    a memory; and
    a processor, the processor configured to control an output of information to a driver of a vehicle by:
    determining workload data indicative of a workload of the driver, and
    generating control data for controlling the output of information to the driver based at least in part on the workload data,
    wherein the control data is configured to, at least one selected from the group of:
    delay or expedite the output of the information, or a visual and/or auditory component thereof;

suppress the output of the information, or a visual and/or auditory component thereof;

modify a prominence of the output of the information, or a visual and/or auditory component thereof;

modify the output of the information, or a visual and/or auditory component thereof; and transform a modality of the output of the information, or visual and/or auditory component thereof.

14. The apparatus of claim 13, wherein the apparatus is or is included in at least one of:
a mobile device;
a device integrated into the vehicle;
a navigation device;
a portable device;
a media output device; and
a server.

15. The apparatus of claim 13, wherein controlling the output of information to the driver comprises one or more of:
controlling an output of information to the driver from a mobile communications device;
controlling an output of information to the driver from a media rendering device; and
controlling an output of information to the driver from a navigation device.

16. The apparatus of claim 13, wherein the workload data is determined based at least in part on data from a first system, and wherein the control of the output of information comprises controlling the output of information from a second system different from the first system.

17. The apparatus of claim 13, further comprising:
receiving a set of context data indicative of one or more contexts, wherein each context is associated with a quantitative measure of at least one of: the visual workload of the driver, the auditory workload of the driver, and the cognitive workload of the driver; and
wherein determining the workload data comprises determining, for each context of the set of context data, a quantitative measure of at least one of: the visual workload of the driver, the auditory workload of the driver, and the cognitive workload of the driver.

18. A computer readable storage medium storing instructions which, when executed by a processor, cause the processor to perform a method for controlling an output of information to a driver of a vehicle, the method comprising:
determining workload data indicative of a workload of the driver, and
generating control data for controlling the output of information to the driver based at least in part on the workload data,
wherein the control data is configured to, at least one selected from the group of:
delay or expedite the output of the information, or a visual and/or auditory component thereof;
suppress the output of the information, or a visual and/or auditory component thereof;
modify a prominence of the output of the information, or a visual and/or auditory component thereof;
modify the output of the information, or a visual and/or auditory component thereof; and
transform a modality of the output of the information, or visual and/or auditory component thereof.

19. The computer readable storage medium of claim 18, wherein controlling the output of information to the driver comprises one or more of:
controlling an output of information to the driver from a mobile communications device;
controlling an output of information to the driver from a media rendering device; and
controlling an output of information to the driver from a navigation device.

20. The computer readable storage medium of claim 18, further comprising:
receiving a set of context data indicative of one or more contexts, wherein each context is associated with a quantitative measure of at least one of: the visual workload of the driver, the auditory workload of the driver, and the cognitive workload of the driver, and
wherein determining the workload data comprises determining, for each context of the set of context data, a quantitative measure of at least one of: the visual workload of the driver, the auditory workload of the driver, and the cognitive workload of the driver.

* * * * *